US010286814B2

(12) United States Patent
Ploch et al.

(10) Patent No.: US 10,286,814 B2
(45) Date of Patent: May 14, 2019

(54) EASY ENTRY SEAT ASSEMBLY WITH RECLINER LOCKOUT MECHANISM

(71) Applicant: Magna Seating Inc, Aurora (CA)

(72) Inventors: Steven Ploch, White Lake, MI (US); Omar D Tame, West Bloomfield, MI (US)

(73) Assignee: Magna Seating Inc., Aurora, Ontario (CA)

( * ) Notice: Subject to any disclaimer, the term of this patent is extended or adjusted under 35 U.S.C. 154(b) by 160 days.

(21) Appl. No.: 15/374,257

(22) Filed: Dec. 9, 2016

(65) Prior Publication Data

US 2017/0166092 A1     Jun. 15, 2017

Related U.S. Application Data

(60) Provisional application No. 62/264,894, filed on Dec. 9, 2015.

(51) Int. Cl.
| | |
|---|---|
| *B60N 2/08* | (2006.01) |
| *B60N 2/07* | (2006.01) |
| *B60N 2/22* | (2006.01) |
| *B60N 2/20* | (2006.01) |

(52) U.S. Cl.
CPC .................. *B60N 2/08* (2013.01); *B60N 2/07* (2013.01); *B60N 2/20* (2013.01); *B60N 2/22* (2013.01)

(58) Field of Classification Search
None
See application file for complete search history.

(56) References Cited

U.S. PATENT DOCUMENTS

| 4,634,180 A * | 1/1987 | Zaveri ................ B60N 2/123 |
| | | 248/430 |
| 5,605,377 A * | 2/1997 | Tame ................. B60N 2/123 |
| | | 248/430 |
| 5,695,247 A * | 12/1997 | Premji ................. B60N 2/12 |
| | | 297/341 |
| 8,757,720 B2 | 6/2014 | Hurst, III et al. |
| 8,967,719 B2 | 3/2015 | Ngiau et al. |
| 9,061,605 B2 | 6/2015 | Hurst et al. |
| 9,114,736 B2 | 8/2015 | Ngiau et al. |

(Continued)

*Primary Examiner* — David E Allred
(74) *Attorney, Agent, or Firm* — Miller Canfield (57) ABSTRACT

A seat assembly for an automotive vehicle comprising a seat cushion and a seat back for pivotal movement between an upright seating position and a forwardly dumped position. A recliner mechanism is operatively coupled between the seat cushion and the seat back for selective actuation between a locked and unlocked condition allowing the pivotal movement of the seat back. A seat track assembly is coupled to the seat cushion for selective actuation between a locked and unlocked condition allowing fore and aft sliding movement of the seat assembly between a passenger comfort position and a full forward position. A recliner lockout mechanism is operatively coupled between the recliner mechanism and the seat back for selectively actuating the seat track assembly to the unlocked condition and provide movement of the seat assembly to the full forward position in response to pivotal movement of the seat back to the forwardly dumped position and retaining the seat back in the forward dumped position until the seat assembly is returned to a passenger comfort position and the seat track assembly is actuated to the locked condition.

10 Claims, 8 Drawing Sheets

(56) References Cited

U.S. PATENT DOCUMENTS

| | | | | |
|---|---|---|---|---|
| 2013/0057043 A1* | 3/2013 | Ngiau | ................. | B60N 2/123 |
| | | | | 297/378.1 |
| 2013/0278033 A1* | 10/2013 | Tame | ................. | B60N 2/0818 |
| | | | | 297/344.1 |
| 2014/0375095 A1* | 12/2014 | Schumann | ........... | B60N 2/0705 |
| | | | | 297/344.1 |

* cited by examiner

EASY ENTRY SEAT ASSEMBLY WITH RECLINER LOCKOUT MECHANISM

CROSS-REFERENCE TO RELATED APPLICATION

This application claims priority to and all the benefits of U.S. Provisional Application No. 62/264,894, filed on Dec. 9, 2015 and entitled "Recliner EZE Lockout".

BACKGROUND OF THE INVENTION

1. Field of the Invention

The present invention relates to a vehicle seat assembly adapted to be mounted to a vehicle floor by a track assembly and including a seat back pivotally coupled to a seat cushion by a recliner mechanism wherein an easy entry track mechanism allows the seat assembly to slide fore and aft along the track assembly between a passenger comfort position and a full forward position in response to pivotal movement of the seat back between an upright position and a forwardly dumped position while a recliner lockout mechanism retains the seat back in the forward dumped position until the seat assembly is returned to a passenger comfort position.

2. Description of Related Art

Automotive vehicles typically include one or more seat assemblies having a seat cushion and a seat back for supporting passengers above a vehicle floor. The seat assembly is commonly mounted to the vehicle floor by a seat track assembly for providing fore and aft adjustment of the seat assembly for passenger comfort. The seat back is also typically pivotally coupled to the seat cushion by a recliner mechanism for providing pivotal movement between an upright seating position, a plurality of reclined positions, and a forwardly dumped position at least partially overlying the seat cushion.

The seat track assembly provides sliding fore and aft movement of the seat assembly between a plurality of passenger comfort positions, and a full forward, or easy entry, position. It is commonly known to provide a release mechanism for selectively unlocking the recliner mechanism to provide pivotal movement of the seat back to the forwardly dumped position. It is also known to provide an easy entry release mechanism for unlocking the seat track assembly in response to pivotal movement of the seat back to the forwardly dumped position. It is known to actuate both release mechanisms to enable pivotal movement of the seat back to the forwardly dumped position and forward sliding of the seat assembly to the full forward position to allow easy ingress and egress within the vehicle behind the seat assembly.

It is desirable to provide a recliner lockout mechanism which retains the seat back in the forward dumped position until the seat assembly is returned from the forwardly dumped position to a passenger comfort position.

SUMMARY OF THE INVENTION

According to one aspect of the invention, a seat assembly for an automotive vehicle is provided comprising a seat cushion and a seat back operatively coupled to the seat cushion for pivotal movement between an upright seating position and a forwardly dumped position at least partially overlying the seat cushion. A recliner mechanism is operatively coupled between the seat cushion and the seat back for selective actuation between a locked and unlocked condition allowing the pivotal movement of the seat back. A seat track assembly is coupled to the seat cushion for selective actuation between a locked and unlocked condition allowing fore and aft sliding movement of the seat assembly within the vehicle between a plurality of passenger comfort positions and a full forward, easy entry position. A recliner lockout mechanism is operatively coupled between the recliner mechanism and the seat back for selectively actuating the seat track assembly to the unlocked condition and providing movement of the seat assembly to the full forward position in response to pivotal movement of the seat back to the forwardly dumped position and retaining the seat back in the forwardly dumped position until the seat assembly is returned to a passenger comfort position and the seat track assembly is actuated to the locked condition.

BRIEF DESCRIPTION OF THE DRAWING

Advantages of the present invention will be readily appreciated as the same becomes better understood by reference to the following detailed description when considered in connection with the accompanying drawings wherein.

DETAILED DESCRIPTION OF THE PREFERRED EMBODIMENTS

Figure 1:
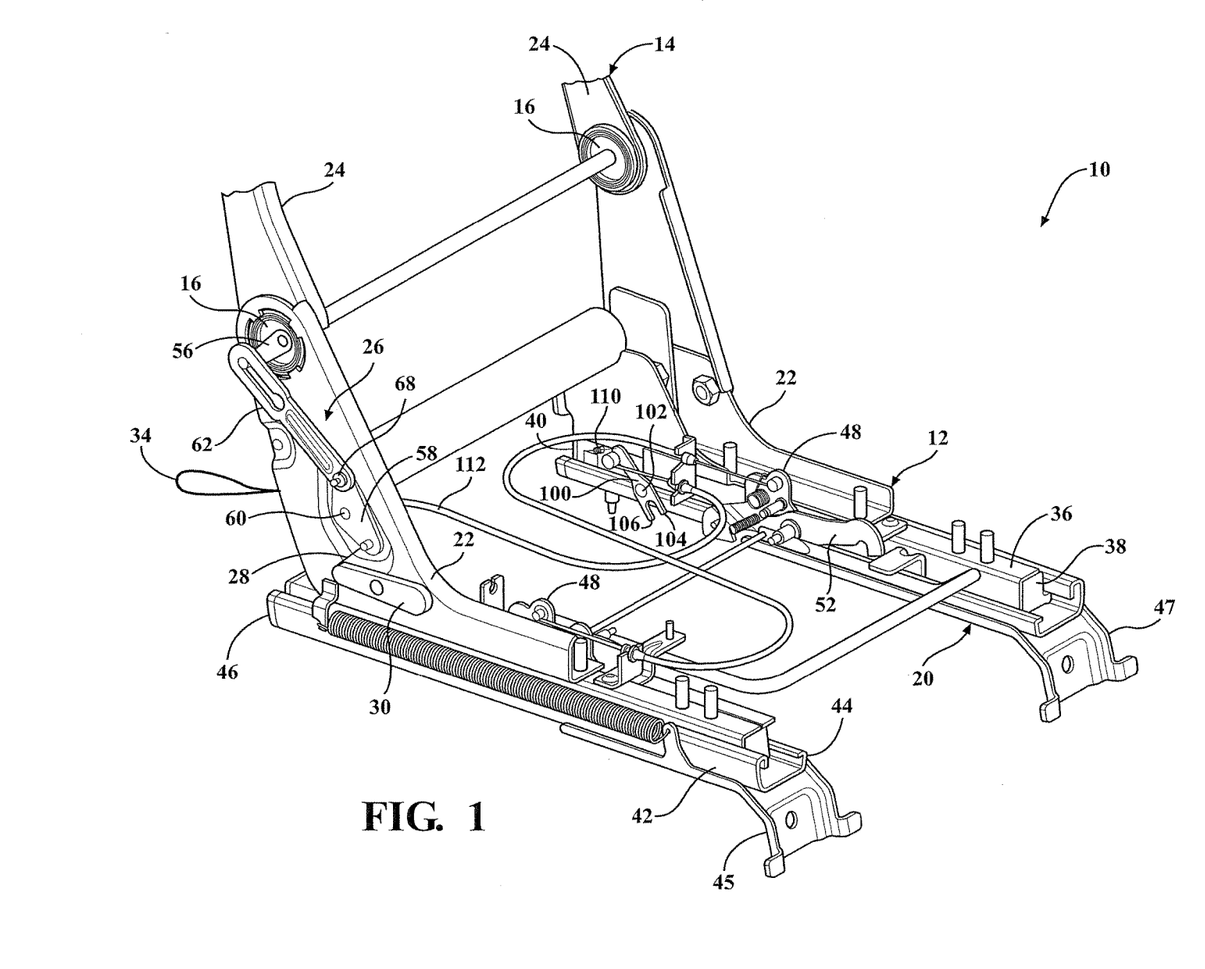
FIG. 1 is a perspective view of a vehicle seat assembly including a seat back pivotally coupled to a seat cushion and having a seat track assembly for slidably mounting the seat assembly to a vehicle according to a preferred embodiment of the invention.

Referring to the Figures, wherein like numerals indicate like or corresponding parts throughout the several views, a seat assembly for use in an automotive vehicle is generally shown at 10. Referring to FIG. 1, the seat assembly 10 includes a generally horizontal seat cushion 12 and a generally upright seat back 14 operatively coupled by a recliner mechanism 16 to the seat cushion 12 for providing pivotal movement between an upright seating position, a plurality of reclined positions, and a forwardly dumped position at least partially overlying the seat cushion 12, as is commonly known to one skilled in the art. The seat assembly 10 is adapted to be mounted to a vehicle floor by a seat track assembly 20 for providing fore and aft adjustment of the seat assembly 10.

The seat cushion 12 typically includes a seat cushion frame for supporting a cellular foam pad encased in a trim cover and the seat back 14 typically includes a seat back frame for supporting a cellular foam pad encased in a trim cover, as is commonly known to one skilled in the art. The seat cushion 12 includes a pair of spaced apart seat cushion brackets 22 fixedly secured to the seat track assembly 20 and the seat back 14 includes a corresponding pair of spaced apart seat back brackets 24 pivotally coupled to respective seat cushion brackets 22 by a recliner mechanism 16. The recliner mechanism 16 is a disc recliner as is commonly known in the art, however, may be any type of recliner mechanism for providing selective pivotal movement of the seat back 14 relative to the seat cushion 12. The recliner mechanism 16 of the disc recliner type is fully disclosed in U.S. Pat. No. 6,312,053, which is incorporated by reference herein in its entirety. A recliner release mechanism 26 is operatively coupled to the recliner mechanism 16 for selectively unlocking each recliner mechanism 16 and allowing pivotal movement of the seat back 14 between the seating position, reclined positions, and forwardly dumped position. The recliner release mechanism 26 may be any type known in the art for selectively actuating the recliner mechanisms 16 between a locked condition and an unlocked condition allowing pivotal movement of the seat back 14.

Figure 2:
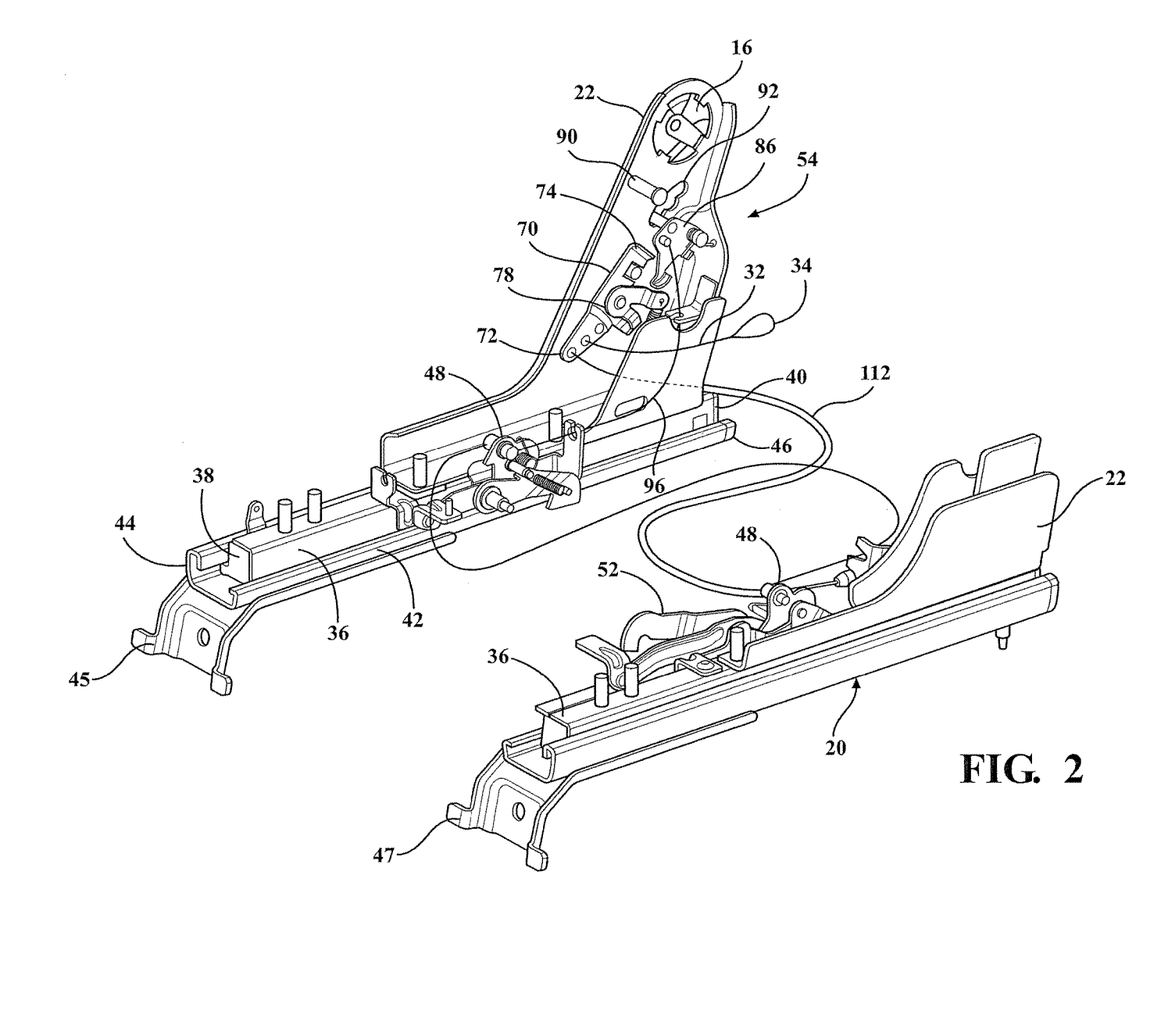
FIG. 2 is a perspective view of seat track assembly and recliner lockout mechanism.

Referring to FIG. 1, a first release cable 28 extends between a first release handle 30 and the recliner release mechanism 26 for actuating the recliner mechanisms 16 between locked and unlocked conditions to allow pivotal adjustment of the seat back 14 between the plurality of reclined positions. Referring to FIG. 2, a second release cable 32 extends between a second release handle 34 and the recliner release mechanism 26 for actuating the recliner mechanisms 16 between locked and unlocked conditions to allow pivotal movement of the seat back 14 to the forwardly dumped position.

The track assembly 20 provides selective fore and aft sliding adjustment of the seat assembly 10 along the vehicle floor (not shown). The seat track assembly 20 includes an a pair of spaced apart and parallel upper tracks 36 extending between opposite forward and rearward ends 38, 40 and slidably coupled to a corresponding pair of spaced apart and parallel lower tracks 42 extending between corresponding forward and rearward ends 44, 46. The seat cushion brackets 22 are fixedly secured to the upper tracks 36 adjacent the rearward ends 40. The lower tracks 42 are fixedly secured to the vehicle floor by riser mounting brackets 45, 47. A seat track locking mechanism 48 of any type commonly known in the art is operatively coupled between each of the upper track 36 and lower track 42 for selective actuation between a locked condition and an unlocked condition allowing fore and aft sliding movement of the upper track 36 relative to the lower track 42.

Referring to FIGS. 1 and 2, the seat assembly 10 further includes an easy entry release mechanism 52 operatively coupled to the track assembly 20 for allowing sliding movement of the seat assembly 10 between a passenger comfort position and a full forward, or easy entry, position in response to pivotal movement of the seat back 14 to the forwardly dumped position. The easy entry release mechanism 52 is further and fully described in Applicant's U.S. Pat. No. 8,967,719 which is incorporated herein by reference in its entirety.

Figure 3:
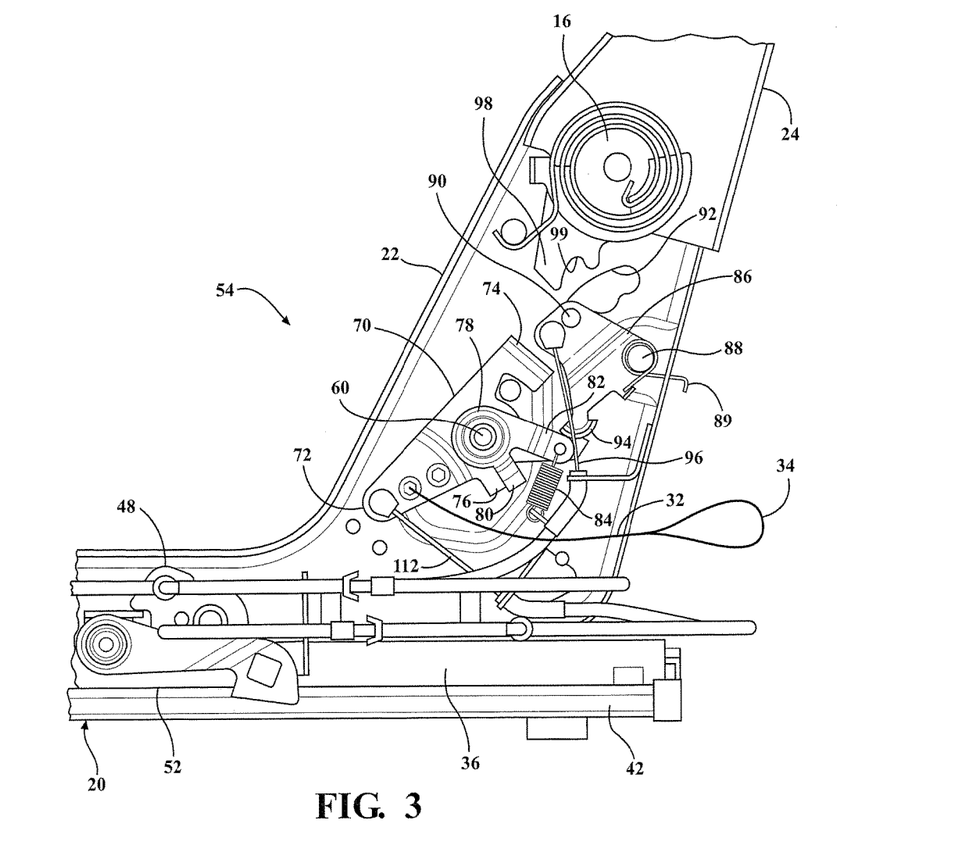
FIG. 3 is a side view of the recliner lockout mechanism.
Figure 4:
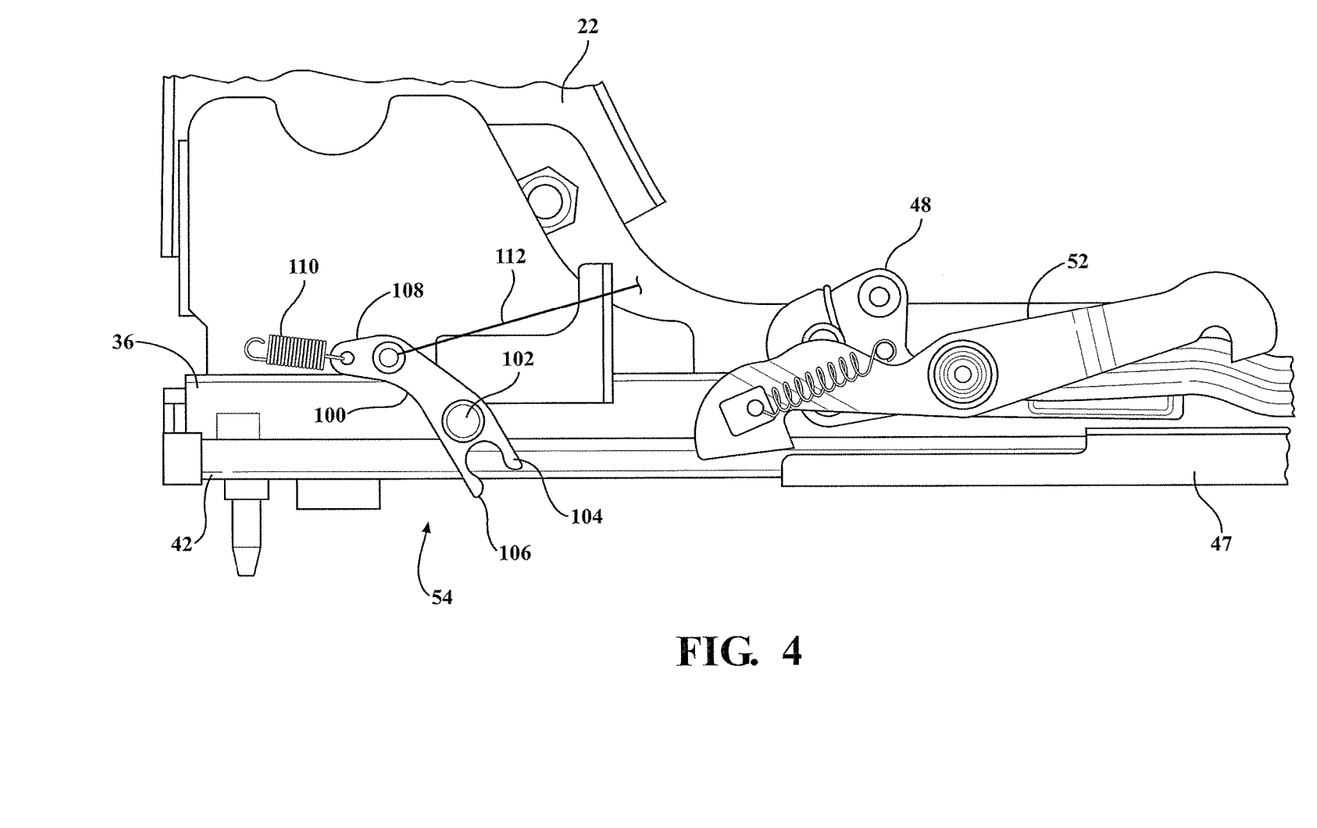
FIG. 4 is a side view of the seat track assembly and release trigger of the recliner lockout mechanism.

Referring to FIGS. 3 and 4, the seat assembly 10 further includes a recliner lockout mechanism 54 for selectively retaining the seat back 14 in the forwardly dumped position when the seat assembly 10 is moved from a passenger comfort position to the full forward, or easy entry, position until the seat assembly is returned to a passenger comfort position. That is, it is often desirable to slide the seat assembly 10 along the track assembly 20 from a passenger comfort position for supporting an occupant in the seat 10 to a full forward position, often referred to as an easy entry position, to allow access behind the seat assembly 10. The easy entry position is typically accomplished by unlocking the recliner mechanism 16 to allow the seat back 14 to pivot from the upright seating position to the forwardly dumped position. The seat track assembly 20 is automatically actuated to the unlocked condition in response to pivoting of the seat back 14 to the forwardly dumped position to allow the seat assembly 10 to slide forwardly along the track assembly 20 to the full forward position. However, it is desirable to lock or block the seat back in the forwardly dumped position while the seat assembly 10 is in the full forward position to prevent an occupant from using the seat assembly 10 in the full forward position and while the track assembly is in an unlocked condition. The recliner lockout mechanism 54 of the present invention maintains the seat back 10 in the forwardly dumped position until the seat assembly 10 is returned rearwardly to a passenger comfort position and locked condition.

Figure 5:
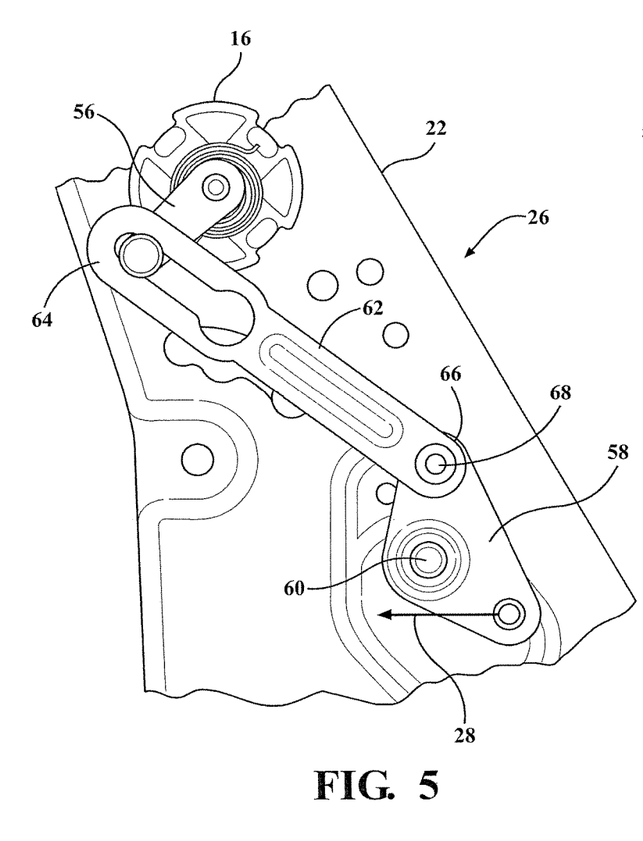
FIGS. 5 and 6 are side views of the operation of the recliner release mechanism.
Figure 6:
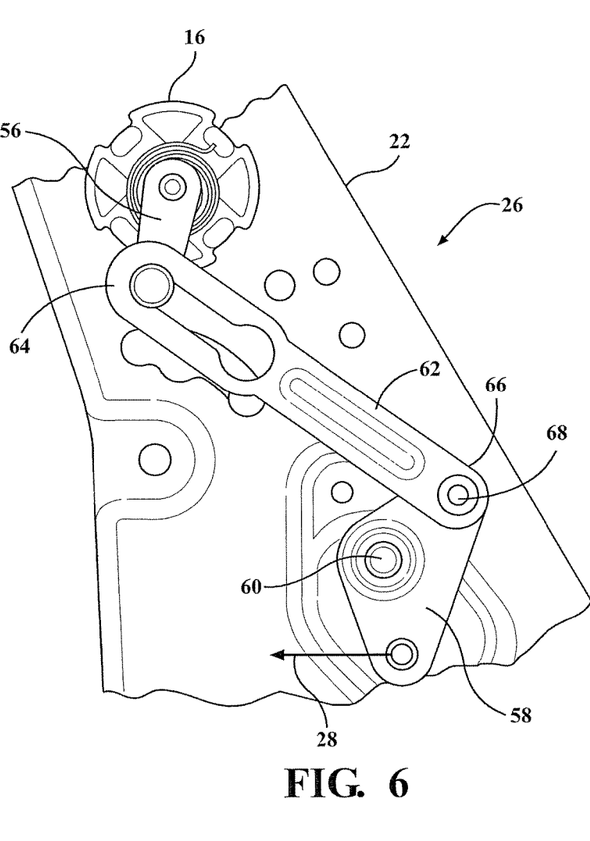

More specifically, referring to FIGS. 5 and 6, the recliner mechanism 16 and recliner release mechanism 26 are shown in more detail. The recliner mechanism 16 includes a recliner lever 56 for actuating the recliner mechanism 16 between a looked condition, shown in FIG. 5, and an unlocked condition, shown in FIG. 6, in response to rotation in the counterclockwise direction to allow the seat back 14 to pivot between the upright seating position, reclined positions, and forwardly dumped position as is commonly known in the art. The recliner release mechanism 26 includes a first release cam 58 pivotally coupled to the outboard side of seat cushion bracket 22 by pivot 60. The first release cable 28 emends from the lower portion of the first release cam 58 for rotating the first release cam 58 clockwise about the pivot 60 in response to actuation of the first release handle 30. A release link 62 extends between a first end 64 slidably coupled to the distal end of the recliner lever 56 and an opposite second end 66 coupled to the upper portion of the first release cam 58 by pivot 68. In operation, with the recliner mechanism 16 in the locked condition as shown in FIG. 5, actuation of the first release handle 30 pulls on the first release cable 28 to rotate the first release cam 58 in the counterclockwise direction. The rotation of the first release cam 58 pulls on the release link 62 to rotate the recliner lever 56 in the counterclockwise direction, thereby actuating the recliner mechanism 16 to the unlocked condition as shown in FIG. 6.

Referring now to FIGS. 3-4 and 7-9, the recliner lockout mechanism 54 is shown in greater detail. The recliner lockout mechanism 54 includes a lockout plate 70 rotatably supported by pivot 60 on the opposite inboard side of the seat cushion bracket 22 and extends between a lower distal end 72 and an opposite upper blocking end 74. A flange 76 extends radially from the lockout plate 70 between the lower distal end 72 and the upper blocking end 74. A dual release cam 78 is rotatably coupled to the inboard side of the seat cushion bracket 22 by the pivot 60. The dual release cam 78 includes a radially projecting first leg 80 spaced angularly from a radially projecting second leg 82. A coil spring 84 extends between the first leg 80 and the seat cushion bracket 22 for biasing the dual release cam 78 in the clockwise direction, thus maintaining the recliner mechanism 16 in the locked condition. The second leg 82 abuts the flange 76 on the lockout plate 70.

Figures 7, 8:
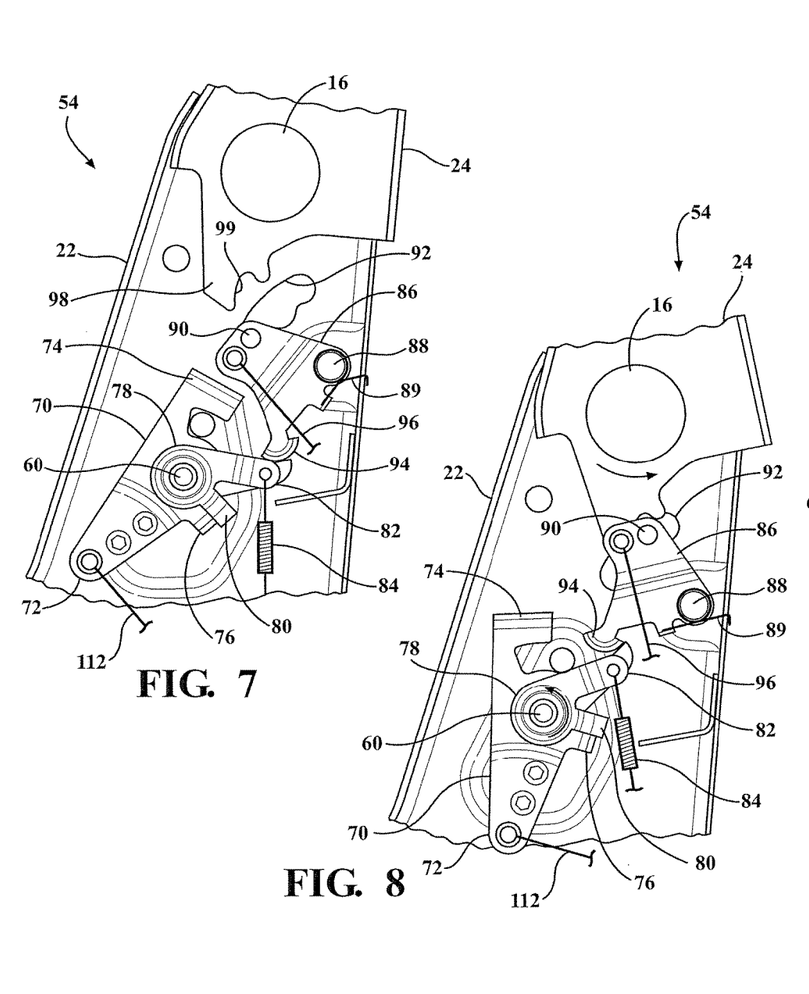
FIGS. 7-9 are side views of the operation of the recliner lockout mechanism.
Figure 9:
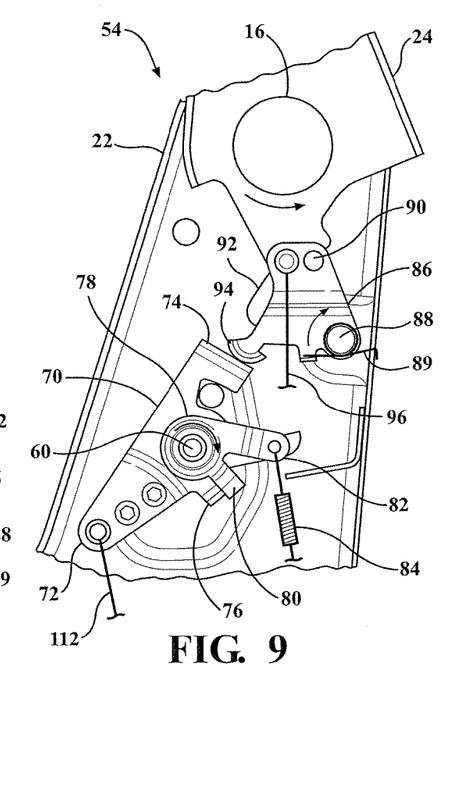
Figure 10:
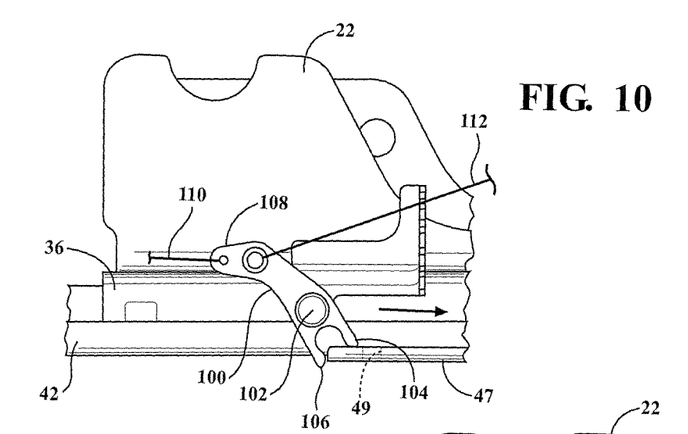
FIGS. 10-15 are side views of the operation of the release trigger in the recliner lockout mechanism.

The recliner lockout mechanism 54 further includes a seat track release cam 86 pivotally coupled to the inboard side of the seat cushion bracket 22 by pivot 88. A clock spring 89 is coupled between the seat track release cam 86 and the seat cushion bracket 22 for biasing the seat track release cam 86 counterclockwise, thus maintaining the seat track assembly 20 in a locked condition to prevent sliding movement of the upper tracks 36 relative to the lower tracks 42. The seat track release cam 86 includes an upper portion supporting a guide pin 90 received and guided within an arcuate slot 92 formed in the seat cushion bracket 22. A blocking flange 94 extends radially from a lower portion of the seat track release cam 86 for selective engagement with the second leg 82 of the dual release cam 78 and the blocking end 74 of the lockout plate 70. A Bowden type push-pull track cable 96 extends from the upper portion of the seat track release cam 86 to the seat track locking mechanism 48 for actuating the seat track assembly 20 between the locked and unlocked condition in response to rotation at the seat track release cam 86 in the clockwise direction.

In operation, referring to FIGS. 3 and 7-9, the seat assembly 10 may be actuated from a passenger comfort position for supporting a seat occupant to the full forward, or easy entry, position by actuation of the second release handle 34. The second release handle 34 pulls on the second release cable 32 which is attached to the lower distal end 72 of the lockout plate 70, as shown in FIG. 3. The second release cable 32 rotates the lockout plate 70 in the counterclockwise direction about the pivot 60 as shown in FIGS. 7 and 8. The flange 76 engages the first leg 80 on the dual release cam 78 to rotate the dual release cam 78 counterclockwise with the lockout plate 70. The dual release cam 78 is fixed to the pivot 60 thereby causing the first release cam 58 to rotate with the dual release cam 78 and pull on the release link 62 to rotate the recliner lever 56 counterclockwise and actuate the recliner mechanism from the locked to unlocked condition. Simultaneously, the second leg 82 of the dual release cam 78 engages the blocking flange 94 on the seat track release cam 86 to partially rotate the seat track release cam 86 in the clockwise direction and moving the guide pin 90 midway between opposing ends of the arcuate slot 92 as shown in FIG. 8. With the recliner mechanism 16 now in the unlocked condition, the seat back 14 is free to pivot from the upright seating position to the forwardly dumped position. A finger 98 projecting from the seat back bracket 24 with a notch 99 formed therein engages the guide pin 90 to further rotate the seat track release cam 86 clockwise about the pivot 88 pulling on the track cable 96, as shown in FIG. 9, to actuate the seat track locking mechanism 48 to the unlocked condition and allowing the seat track assembly 20 to slide the seat assembly 10 from a passenger comfort position to the full forward, or easy entry, position. Further, as the seat back bracket 24 rotates the seat track release cam 86 clockwise, the blocking flange 94 is spaced from engagement with the second leg 82 on the dual release cam 78 allowing the dual release cam 78 to rotate clockwise by the tension of the coil spring 84, as shown in FIG. 9. With the seat back 14 in the forwardly dumped position and the seat track release cam 86 rotated clockwise fully within arcuate slot 92, the blocking flange 94 of the seat track release cam 86 abuts the blocking end 74 of the lockout plate 70 blocking return pivotal movement of the seat back 14 from the forwardly dumped position.

Referring again to FIG. 4, the recliner lockout mechanism 54 further includes a release trigger 100 for actuating the lockout plate 70 and release the blocking engagement with the seat track release cam 86 when the seat assembly 10 returns to a passenger comfort position for occupant seating. More specifically, the release trigger 100 is pivotally mounted to the upper track 36 by pivot 102 and includes a first proximal end defined by a pair of spaced apart front and rear fingers 104, 106 and an opposite second distal end 108. A coil spring 110 extends between the distal end 108 and the seat cushion bracket 22 for biasing the release trigger 100 in the counterclockwise direction. A trigger cable 112 extends from the distal end 108 to the lower distal end 72 of the lockout plate 70. FIG. 4 shows the release trigger 100 in a home position with the seat assembly 10 in a passenger comfort position wherein the release trigger 100 is spaced rearwardly from the riser mounting bracket 47.

Figure 11:
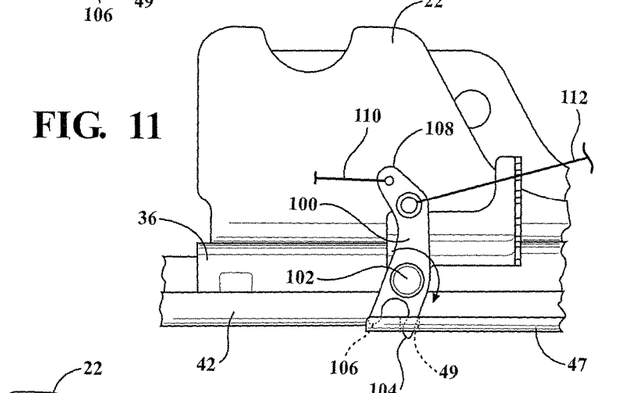
Figure 12:
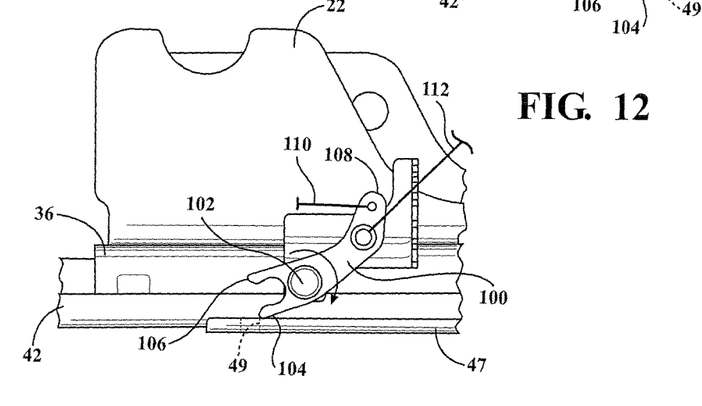
Figure 13:
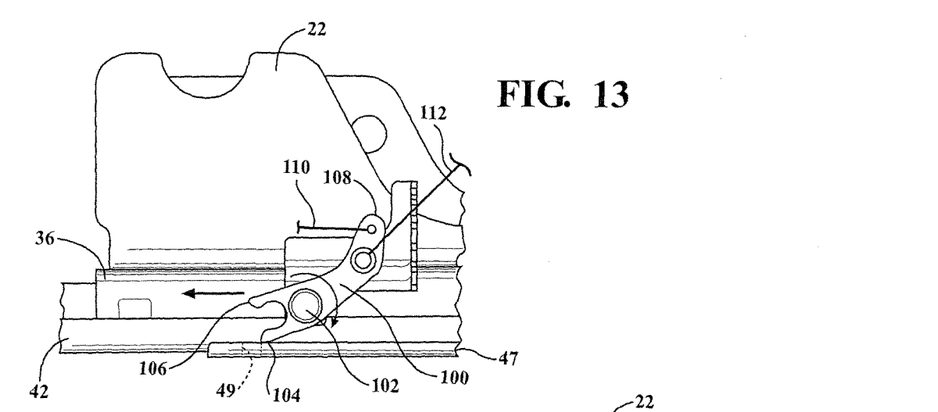
Figure 14:
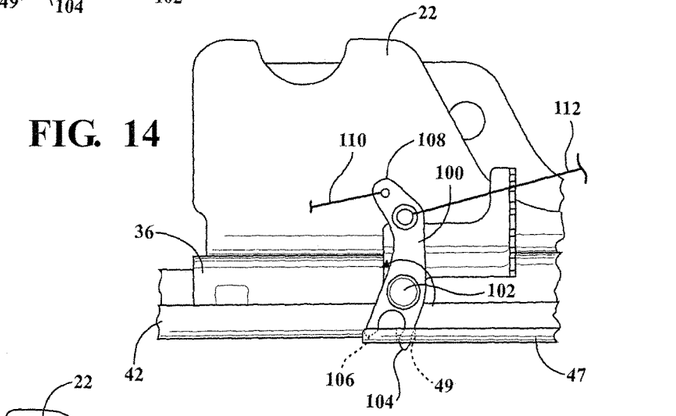
Figure 15:
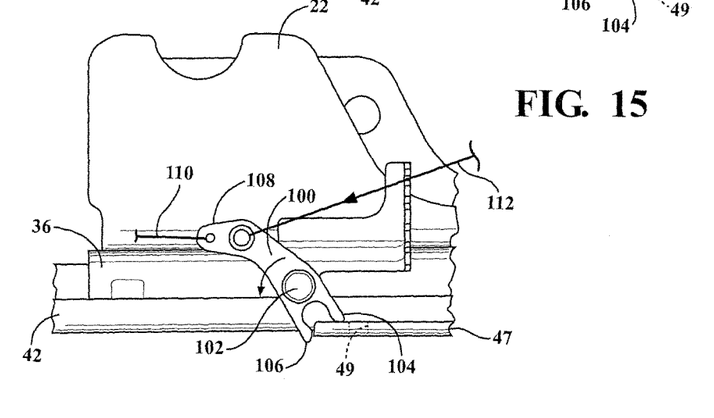

In operation, referring to FIGS. 10-15, as the seat assembly 10 slides forward by the seat track assembly 20 from a passenger comfort position towards the full forward position, the rear finger 106 of the release trigger 100 engages the edge of the riser mounting bracket 47 causing the release trigger 100 to rotate clockwise. The riser mounting bracket 47 also includes an opening 49 therethrough to allow the front finger 104 to pass through the opening 49 and the release trigger 100 to flip over clockwise approximately 100 degrees as shown in FIGS. 11 and 12. As the release trigger 100 rotates clockwise, slack is introduced into the trigger cable 112 to prevent any tension or actuation on the lockout plate 70. Referring to FIGS. 13-15, as the seat assembly 10 returns from the full forward position toward a passenger comfort position, the front finger 104 of the release trigger 100 will drop into the opening 49 in the riser mounting bracket 47 causing reverse counterclockwise rotation of the release trigger 100. Finally, as the release trigger 100 approaches the edge of the riser mounting bracket 47 the front finger 104 will engage the top surface of the bracket 47 as it exits the opening 49 and cause over-rotation of the release trigger 100 in the counterclockwise direction. The over-rotation of the release trigger 100 creates tension and pulls on the trigger cable 112 to briefly rotate the lockout plate 70 counterclockwise and allow the blocking flange 94 of the seat track release cam 86 to clear the blocking end 74 of the lockout plate 70. The seat track release cam 86 is clear to rotate counterclockwise by the bias of the clock spring 89 to release tension in the track cable 96 and actuate the seat track mechanism 48 to the locked condition to prevent further sliding movement of the seat assembly 10 prior to the seat back 14 pivoting from the forwardly dumped position to the upright seating position.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:

1. A seat assembly for an automotive vehicle comprising:
   a seat cushion;
   a seat back operatively coupled to said seat cushion for pivotal movement between an upright seating position and a forwardly dumped position at least partially overlying said seat cushion;
   a recliner mechanism operatively coupled to said seat cushion and said seat back for selective actuation between a locked and unlocked condition allowing said pivotal movement of said seat back;
   a seat track assembly coupled to said seat cushion for selective actuation between a locked and unlocked condition allowing fore and aft sliding movement of said seat assembly within the vehicle between a passenger comfort position and a full forward position; and
   a recliner lockout mechanism operatively coupled to said recliner mechanism and said seat cushion for selectively actuating said seat track assembly to said unlocked condition and provide movement of said seat assembly to the full forward position in response to pivotal movement of said seat back to said forwardly dumped position and retaining said seat back in the forward dumped position until said seat assembly is returned to a passenger comfort position and said seat track assembly is actuated to said locked condition.

2. A seat assembly as set forth in claim 1 wherein said recliner lockout mechanism includes a dual release cam rotatably coupled to said seat cushion and operatively coupled to said recliner mechanism for actuating said recliner mechanism between said locked and unlocked condition.

3. A seat assembly as set forth in claim 2 wherein said recliner lockout mechanism includes a seat track release cam rotatably coupled to said seat cushion and operatively coupled to said seat track assembly for actuating said seat track assembly between said locked and unlocked condition in response to pivotal movement of said seat back between said upright seating position and said forwardly dumped position.

4. A seat assembly as set forth in claim 3 wherein said recliner lockout mechanism includes a lockout plate rotatably coupled to said seat cushion for engaging and rotating said dual release cam to actuate said recliner mechanism between said unlocked and locked condition and for engaging and maintaining said seat track release cam against said seat back in said forwardly dumped position to block pivotal movement of said seat back when said seat track assembly is in said unlocked condition.

5. A seat assembly as set forth in claim 4 wherein said recliner lockout mechanism includes a release trigger pivotally coupled to said seat track assembly for actuating said lockout plate out of engagement with said seat track release cam and allowing pivotal movement of said seat back when said seat track assembly returns to said locked condition.

6. A seat assembly as set forth in claim 5 wherein said seat track assembly includes a seat track locking mechanism operatively coupled to said seat track assembly for actuation between said locked condition and unlocked condition providing fore and aft sliding movement of said seat assembly between said passenger comfort and full forward position.

7. A seat assembly as set forth in claim 6 further including a track cable coupled between said seat track locking mechanism and said seat track release cam for actuating said seat track locking mechanism between said locked and unlocked conditions in response to rotation of said seat track release cam.

8. A seat assembly as set forth in claim 7 further including a trigger cable coupled to said release trigger and said lockout plate for actuating said lockout plate and rotating said lockout plate out of engagement with said seat track release cam and allowing pivotal movement of said seat back when said seat track assembly returns to said locked condition.

9. A seat assembly as set forth in claim 8 wherein said seat track assembly includes a upper track slidably coupled to a lower track and a riser mounting bracket fixedly secured to said lower track for mounting said seat assembly in the vehicle.

10. A seat assembly as set forth in claim 9 wherein said release trigger is pivotally coupled to said upper track and includes a pair of spaced apart front and rear fingers projecting below said riser mounting bracket wherein said rear finger engages said riser mounting bracket during movement of said seat assembly from said passenger comfort position to said full forward position providing slack in said trigger cable to maintain said seat track release cam blocked between said seat back and said lockout plate and said front finger engages said riser mounting bracket during movement of said seat assembly from said full forward position to said passenger comfort position to rotate said release trigger and pull said trigger cable in tension to actuate said lockout plate out of blocking engagement with said seat track release cam to allow pivotal movement of said seat back.

\* \* \* \* \*